June 28, 1966  J. A. CRONE ETAL  3,258,078
WEIGHING SCALE WITH PLATFORM SUSPENDED FROM LOAD
LINKS BEARING STRAIN GAUGES
Filed Feb. 23, 1965  2 Sheets-Sheet 2

INVENTORS
GARY H. KLING
JOHN A. CRONE
RONALD C. KAMP
BY
ATTORNEY

United States Patent Office 3,258,078
Patented June 28, 1966

3,258,078
WEIGHING SCALE WITH PLATFORM SUSPENDED FROM LOAD LINKS BEARING STRAIN GAUGES
John A. Crone, Metamora, and Gary H. Kling, East Peoria, Ill., assignors to LeTourneau-Westinghouse Company, Peoria, Ill., a corporation of Illinois
Filed Feb. 23, 1965, Ser. No. 434,586
6 Claims. (Cl. 177—211)

The present invention relates to weighing scales generally, and more particularly, to easily movable weighing scales for use in quickly and accurately determining the weight of a wheeled vehicle.

The payload being carried by, or the gross weight of, a wheeled vehicle is of importance for a variety of reasons. It is necessary, for example, in determining compliance with various highway laws and regulations relating to vehicle weight. It is also required to ascertain the efficiency of a given earthmoving or mining operation. Whatever the reasons, a means for quickly and accurately determining the weight of a vehicle is highly desirable.

It is not always possible or practical to provide a permanent weighing installation because the nature of the terrain or the project involved is not suitable for such an installation, as, for example, when an earthmoving operation will require only a few weeks for completion. The desirability of a scale that is easily movable from one location to another is readily apparent.

It is, therefore, an object of the present invention to provide a simple weighing scale which is light of weight, compact and easily transportable.

It is also an object of this invention to provide a weighing scale which is accurate, produces a reading of the weight imposed thereon quickly, is stable, and capable of a multitude of cycles without failures.

It is another object of this invention to provide a weighing scale which is capable of weighing objects many times greater than the weight of the scales itself and which is relatively unaffected by weather conditions.

These and other objects will be apparent from the following specification and the accompanying drawings, wherein.

Figure 1:
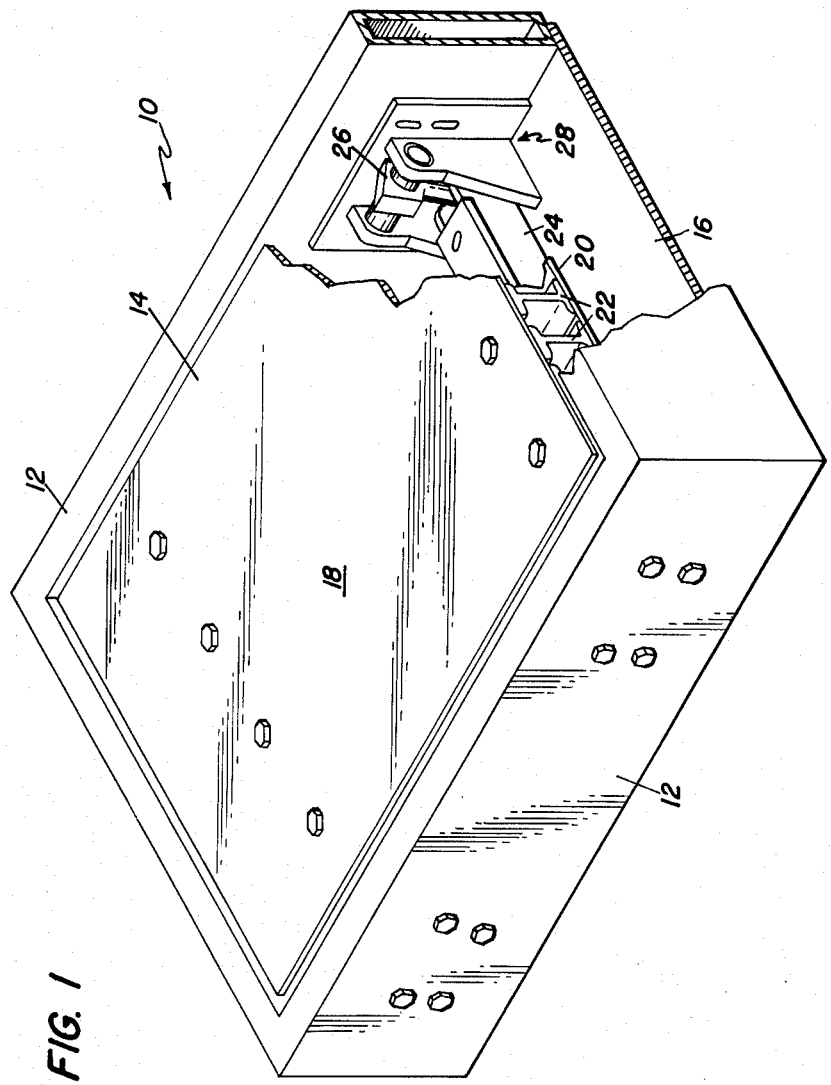
FIG. 1 is an isometric view of a scale unit for the present invention, with parts broken away to show portions of the interior.
Figure 2:
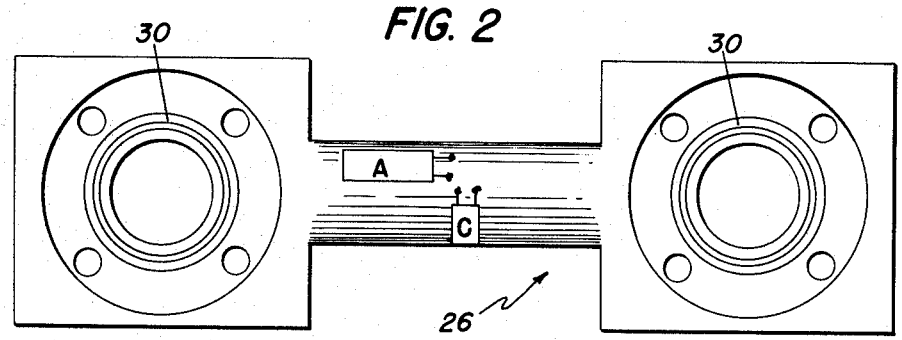
FIG. 2 is a plan view of one of the load links utilized in the present invention; and, FIG. 3 is a schematic circuit diagram illustrating the relationship of the strain gages on one of the scale units.

Referring now in detail to the drawings, there is shown in FIG. 1, a scale unit, indicated generally at 10, which consists basically of a frame 12 and a load supporting platform 14. The frame is provided with a bottom plate 16 and is sealed at all joints, as by welding, to protect the other components of the scale to be described hereinafter. The bottom plate 16 not only serves to protect the interior components of the unit but also provides a large area to keep bearing pressures on the ground to a minimum. The platform 14 preferably consists of a pair of aluminum or other light weight metal plates 18 and 20 spaced apart by and fastened to a plurality of aluminum I-beams 22. The platform 14 rests upon and is secured to a pair of suspension beams 24, only one of which is shown in FIG. 1. The suspension beams are pinned at each end to a load link 26. Each load link 26 is also connected to the frame by means of a pin and gusset arrangement indicated generally at 28. The platform 14 is, therefore, suspended from the frame 12 by means of the load links 26 and the suspension beams 24. As is best seen in FIG. 2, each of the load links 26 is provided with a self-aligning bushing 30 at each end. The bushings 30 permit universal movement, to a limited extent, of the load link with respect to both the frame 12 and the suspension beams 24. Such movement precludes the application of a side load on the platform 14, and the load links are therefore subjected to only tension, neglecting of course the friction effects within the self-aligning bearing itself. Each load link has four strain gages, A and C, attached to the surface thereof. Two of the gages A are arranged so that their axes are parallel to the principal stress axis of the load link and are the active gages. The other two gages C are arranged so that their axes are perpendicular to the principal stress axis, and are the temperature compensating gages. All of the strain gages are of the electrical resistance type and are responsive to the application of tension strains, such as, for example, those disclosed in U.S. Patent Nos. 2,344,647 and 2,434,628.

Figure 3:
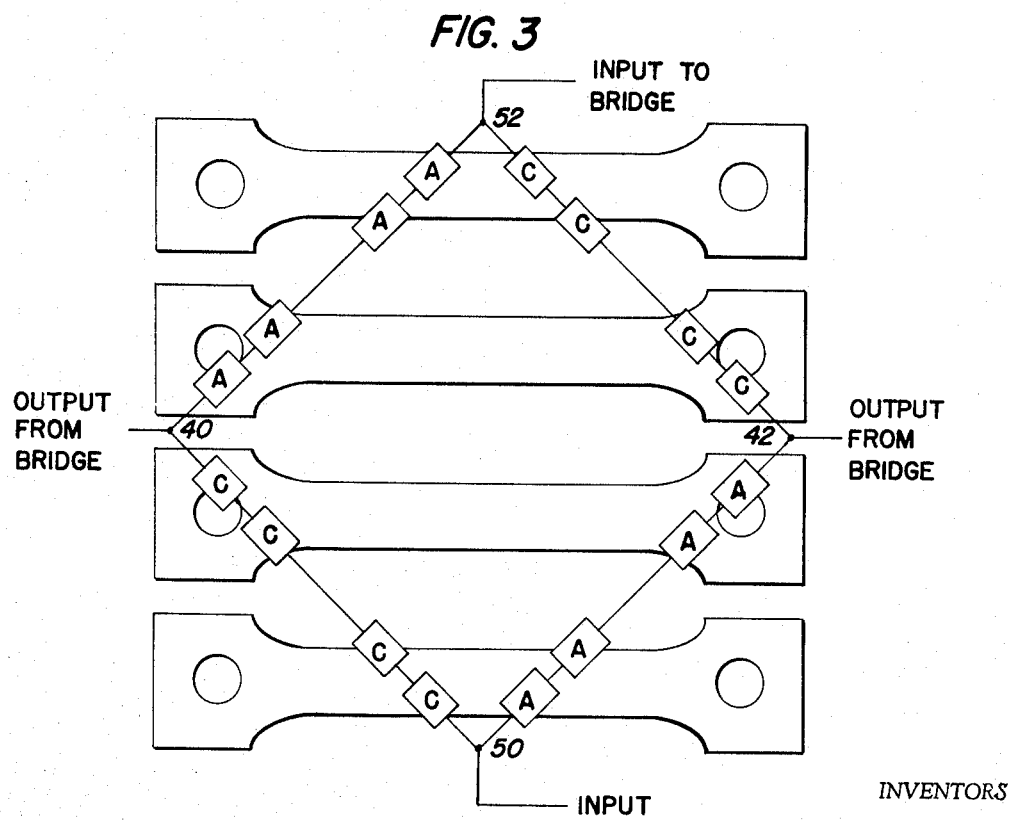

The strain gages are connected, as shown schematically in FIG. 3, to form basically a Wheatstone bridge, the active gages forming two opposite legs of the bridge and the compensating gages forming the other two opposite legs. A D.C. voltage is applied to the bridge at points 50 and 52 and the resulting unbalance is read at points 40 and 42 as a voltage.

Operation

Since the vehicles being weighed are often quite large and it is desirable to keep the weight of the scales to a minimum, two scale units, each identical to that shown in FIG. 1, are utilized. They are positioned on or in the ground so that there will be little, if any, weight transfer along the longitudinal axis of the vehicle occasioned by fore and aft inclination of the vehicle when in position to be weighed. Each of the scale units 10 has a platform 14 with a large enough area to accept one wheel or set of wheels on the vehicle. The two scale units are oriented and spaced apart so that they will support the wheels on one axle of the vehicle. The bridges provided by the strain gages in each scale unit are connected in parallel, i.e., the point 40 on the bridge shown in FIG. 3 is connected to the equivalent point on the identical bridge circuit provided by the second scale unit 10, and similarly for the points 42, 50 and 52. In order to obtain a quick accurate reading of the weight imposed on both scale units 10, it is preferred that a closed loop, servo-driven, null-balance digital indicator of the electro-mechanical type, such as the Model 500 Series Cox Digital Force Indicator, be used. In an instrument of this type, the output or voltage from the parallel bridges is applied to one side of a servo amplifier for comparison with a similar input or voltage taken from a null-balance potentiometer. Any difference in potential between the two inputs is then amplified and applied to the servo-motor. The servo-motor drives the potentiometer to a new null-balance point until the two inputs are equal. The amount of rotation of the servo-motor required to attain the same potential provides a direct reading of the combined load on the scale units since the motor is geared to a digital indicator. By weighing each axle of the vehicle in this manner, a value for the entire weight of the vehicle can be attained.

It can be seen that the present invention does provide a weighing device which will be light weight and compact in and of itself, and therefore, can be easily transported. It can also be appreciated that the absence of moving parts, except for the self-aligning bushings which move only when a side load is imposed on the platform, make possible the repeated use of the scales without failure. It can also be seen that, since the load links are subjected to pure tension, the resultant weight will be quite accurate, and the use of a servo-driven, null-balance digital indicator provides a quick reading of the total weight on the scale units. In addition, the weight limit of the scales is determined by the stress capabilities of the components utilized in construction of the scale units and thus the units can weigh objects several times heavier, often on the order of fifty times greater, than the scale itself.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:
1. A weighing device comprising:
   a frame,
   a load supporting platform,
   a plurality of load links suspending said platform from the frame,
   a plurality of compensating strain gages and active strain gages secured to said links,
   universal connector means interposed between the ends of each load link and the respective one of said platform and frame so that said links are subjected to tension only,
   and means for measuring the change in resistance of said gages as a function of the load imposed on said platform.

2. A weighing device comprising:
   a frame,
   a load supporting platform,
   four load links suspending said platform from the frame,
   a pair of compensating strain gages and,
   a pair of active strain gages secured to each of said links,
   universal connector means interposed between the ends of each load link and the respective one of said platform and frame so that said links are subjected to tension only,
   and means for measuring the change in resistance of active gages as a function of the load imposed on said platform.

3. A weighing device comprising:
   a frame,
   a load supporting platform,
   four load links suspending said platform from the frame,
   a pair of compensating strain gages, and
   a pair of active strain gages secured to each of said links,
   said gages connected to form a bridge with the active gages in the other two opposite sides of the bridge,
   universal connector means interposed between the ends of each load link and the respective one of said platform and frame so that said links are subjected to tension only,
   and means for measuring the change in resistance of the active gages as a function of the load imposed on said platform.

4. A weighing device according to claim 3 and further comprising:
   a bottom plate secured to the frame and engageable with the ground when said device is in operable position.

5. A weighing device comprising:
   a frame,
   a load supporting platform,
   a pair of suspension beams secured to the lower side of said platform,
   four load links each universally connected at one end to one end of said beams, and universally connected at the other end to the frame at a point elevated from the point of connection of said links to said beams to be subjected to tension only as load is imposed on said platform,
   a pair of active strain gages and a pair of compensating gages secured to each of said links,
   said gages being electrically connected in a bridge with the active gages forming two sides thereof and the compensating gages forming the other two sides,
   and means for measuring the unbalance of said bridge as a function of the load imposed on said platform.

6. A device for determining the weight of a wheeled vehicle comprising:
   a pair of units each having;
      a frame,
      a load supporting platform,
      four load links universally connected to said platform and the frame in substantially vertical orientation to be subjected to tension only as load is imposed on the platform,
      a pair of compensating strain gages and a pair of active strain gages secured to each load link,
      said gages being electrically connected to form a bridge with the active gages comprising two opposite sides thereof and the compensating gages comprising the other two opposite sides,
   said bridges being connected in parallel,
   and means for measuring the combined change in resistance of said bridges as a function of the total load imposed on said platforms.

References Cited by the Examiner

UNITED STATES PATENTS

| | | | |
|---|---|---|---|
| 2,616,683 | 11/1952 | Le Fevre | 177—211 |
| 2,998,090 | 8/1961 | Watson | 177—211 |
| 3,082,834 | 3/1963 | Ellis | 177—134 |
| 3,103,984 | 9/1963 | Ellis et al. | 177—211 |
| 3,105,564 | 10/1963 | Drmond | 177—211 |

FOREIGN PATENTS

| | | |
|---|---|---|
| 468,718 | 10/1950 | Canada. |
| 1,130,611 | 5/1962 | Germany. |

LOUIS J. CAPOZI, *Primary Examiner.*

LEO SMILOW, *Examiner.*

G. J. PORTER, *Assistant Examiner.*